United States Patent [19]

Steele

[11] 4,048,959
[45] Sept. 20, 1977

[54] MOBILE CORRAL

[76] Inventor: James E. Steele, 1425 E. Magee Road, Tucson, Ariz. 85718

[21] Appl. No.: 705,405

[22] Filed: July 15, 1976

[51] Int. Cl.[2] .................................................. A01K 1/02
[52] U.S. Cl. ...................................................... 119/20
[58] Field of Search ...................... 119/20; 256/23, 24, 256/25, 26

[56] References Cited

U.S. PATENT DOCUMENTS

| 795,503 | 7/1905 | Garethun | 119/20 |
| 3,095,858 | 7/1963 | Bauer | 119/20 X |

FOREIGN PATENT DOCUMENTS

| 683,089 | 11/1952 | United Kingdom | 119/20 |

Primary Examiner—Hugh R. Chamblee
Attorney, Agent, or Firm—J. Michael McClanahan

[57] ABSTRACT

A mobile, portable, and self-propelled corral for penning animals having three fence rail sides and one back side, there being a gate through one fence rail side, with the back side extending up from the rail sides on either side to form a roof over a portion of the corral, there also being facilities attached to the interior back side for feeding and watering the penned animals; the subject invention additionally having wheels mounted at each corner of the corral, two of the back wheels being driven by a prime mover motor means mounted upon the exterior back side together with means for riding upon the subject invention with steering means attached to at least one of the front wheels. By means of a steering lever connecting the front wheel, the invention may be propelled over land in steered fashion in order that selected areas may be pastured or chosen animals may be quarantined from a herd. In addition, the size of the pen may be adjusted by adding or taking away side rail fence sections and the side rail fence sections are adapted to receive supplemental fence sections which may be lowered to the ground in order to pen small animals.

9 Claims, 8 Drawing Figures

MOBILE CORRAL

BACKGROUND OF THE INVENTION

Inventions in the past related to portable corrals for penning animals have comprised basically a fence section lifted above the ground by wheel means, but which have depended upon externally attached motor means, or have depended upon winches utilizing cables attached to distant objects such as trees or stakes in order to propel them across ground. These types of animal corrals have proved to be bulky, slow, and generally unable to provide ready movability together with a means of shelter and feeding of the penned animals.

SUMMARY OF THE INVENTION

The present invention comprises a mobile, portable, self-propelled animal corral means having four sides arranged in a rectangular fashion, three of these sides being fence rail structure with a gate through one side and the fourth side being a solid side having a roof extension attached thereto together with interiorly mounted animal feed and water facilities. Mounted upon the outside back portion of the backside of the fourth side is the prime mover means comprising the gasoline motor, clutch, transmission and differential, which in turn drives two rear wheels upon which the mobile corral is mounted. Two additional wheels are provided in the front of the mobile corral, one wheel for each corner of the rectangular shaped pen form, with at least one wheel being a steering wheel link connected to a steering arm at the rear portion of the invention. The non-steered front wheel is free wheeling, i.e., not fixed, permitting the mobile corral to be steered by the other front wheel, the free wheel following generally the direction of the other front wheel once motion is initiated.

DETAILED DESCRIPTION

Figure 1:
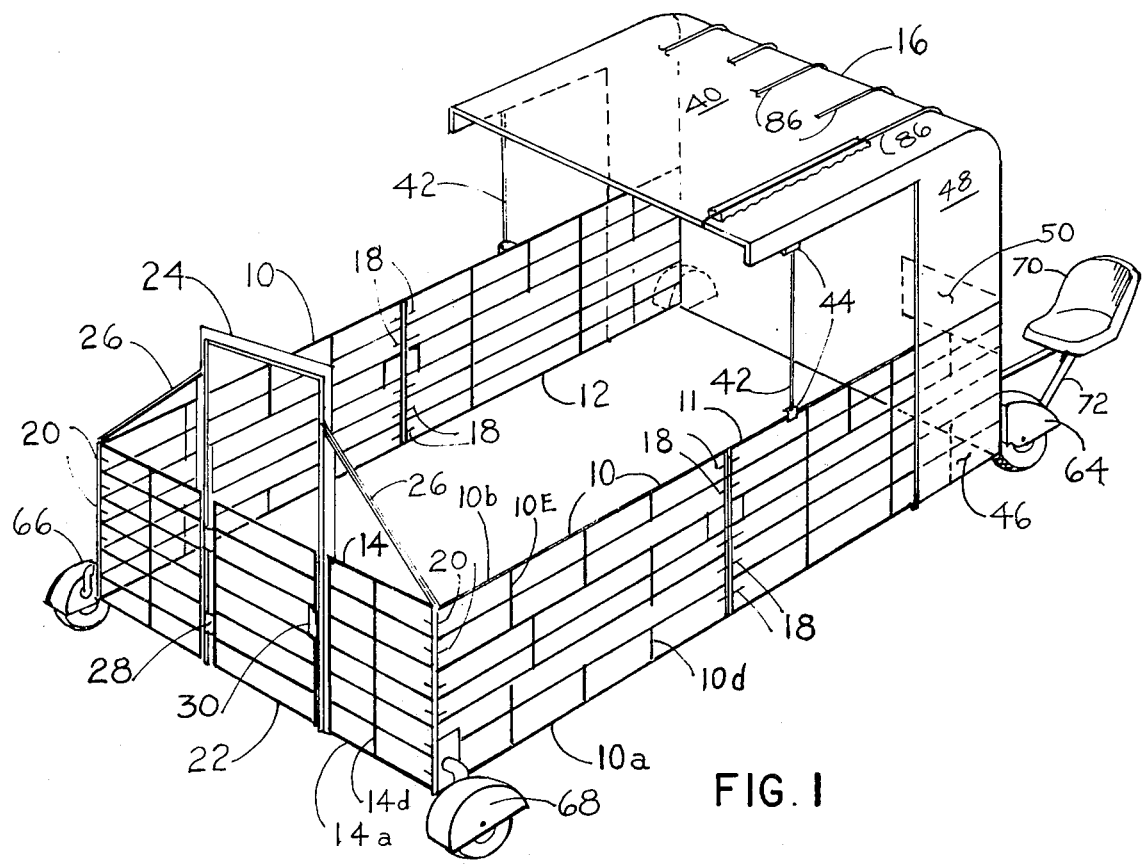
FIG. 1 is a perspective view of the subject invention.

The embodiment of the invention shown in FIG. 1 comprises the rectangular shaped animal corral having three sides of fence-like structure and one side a support for an over hanging roof and animal feeding and watering facilities.

Specifically, the subject mobile portable corral comprises side rail fence panels 10, 11, and 12, and front rail fence panel 14 with gate constructed therein and back panel section 16 joining an over hanging roof 40 and providing facilities for animal feeding and watering together with feed, water, and tack storage, and prime mover means for self-propelling the subject invention.

Basically, the fence-like sections of side rail panels 10 comprise in the preferred embodiment shown in FIG. 1, welded steel square tubing with major longitudinal pieces such as 10a and 10b with cross pieces such as 10d and 10e. Side rail fence panels 10 are joined to the side rail panel 11 and 12 by means of bolts and nuts fastening means 18 which bolt together the end section pieces of side rail panel 10 to the adjoining panels 11 and 12 by penetrating each end piece of the side rail section. The nuts are tightened upon the bolts to place the two sections in rigid relationship.

Similarly, side panels 10 are bolted to front rail panel 14 by nut and bolt means 20. Front rail panel 14 is similarly constructed in the preferred embodiment of tubular steel having longitudinal pieces such as 14a and 14b with perpendicular pieces 14d. Panel 14 is interrupted in its approximate center with gate means 22 similarly constructed of the tubular metal and which resides interior to gate frame 24. Gate frame 24, in addition to being fastened in the preferred embodiment by welding to the front rail panel 14, has side braces 26 which join the gate frame 24 near its topmost part to the distal portion of front rail panel 14. Gate 22 pivots about hinges 28 and is latched by clasp 30. The gate frame 24 is not connected across its bottom with braces.

Side rail panels 11 and 12, which were previously mentioned, join side rail panels 10 which in turn are connected to both ends of front rail panel 14. Side rail panels 11 and 12 are similarly constructed as are panels 10, being comprised of the longitudinal tubular steel members and tubular steel members and tubular steel cross members. In the preferred embodiment all members of the rail panel fence sections are joined by welding. The construction of back panel section 16 is described with reference to the FIG. 2 supra.

The roof of the over hanging roof or sun shade 40, in addition to being supported by the back panel section 16, is additionally supported by means of support bars 42 whose ends nest in U-shaped saddles 44 attached to side rail panels 11 and 12, and over hanging roof 40; there being axle means (not shown) joining both sides of the U-shaped support to the support bar 42 in pivotal relationship. In this manner, side movement of the roof 40, or conversely, movement of the side rail panel relative to the roof, is permitted when forces, such as wind or a horse nudging the rail, are present.

In the preferred embodiment, plywood panel sections 46 and 48 cover the rear end portion of side rail panels 11 and 12 joining with wood panels upon the lower portion and corregated fiberglass panel upon the upper portion of the back panel section to provide wind protection for the end most part of the mobile corral. Also shown in FIG. 1 is panel 50 which is a hinged panel in back panel section 16 permitting a driver to let a hinged panel down in order to see through the back panel for steering the subject invention.

Additionally, as shown in the perspective view of FIG. 1, four wheels are mounted upon the subject invention, one at each corner of the enclosure. Wheel assemblies 62 and 64 are fixed wheels mounted at the rear portion of the subject invention and are the drive wheels driven by the prime mover means (not shown). Front wheel assemblies 66 and 68 comprise the other two wheels and wheel within wheel assembly 66 is completely free-wheeling, i.e., it is a non-steerable, non-fixed direction wheel. It is completely free to turn in any direction, is not influenced by any mechanical or other mechanism, and thereby follows the path of the corral. Wheel assembly 68, however, is steered and does provide the means by which the subject invention is directed to desired locations. Wheel assembly 68's axle (not shown) which provides for the turning of the wheel is controlled from the rear portion of the subject invention by means of steering linkage (not shown)

which in turn is within easy grasp of the operator seated upon seat 70 so situated as to permit control of the driving motor (not shown). The operator sitting in seat 70 is provided visual observation of the area to his right by viewing through hinged panel 50 which is let down when it is desired to move the invention. The operator has a clear view to his left side as the seat is situated in line with the left side of the side rail panels. Seat 70 is attached to support pipe 72 which in turn is attached to wheel housing 64.

Figure 2:
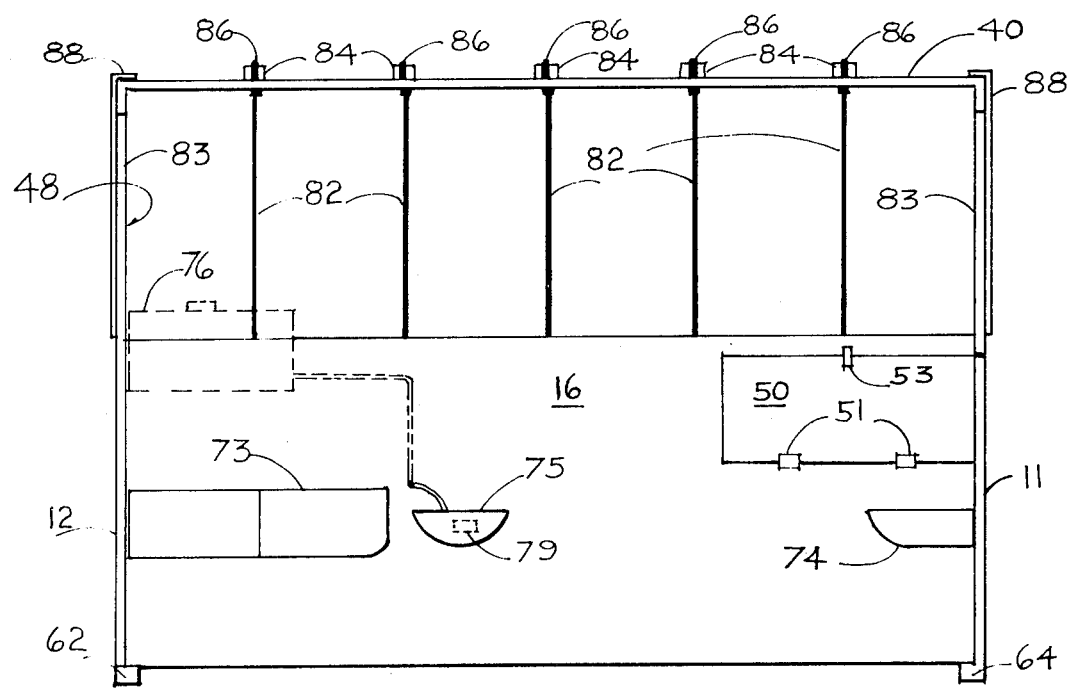
FIG. 2 is a front view of the interior backside.

Reference is now made to FIG. 2 which shows the interior of the back panel section 16 as viewed when standing in the invention enclosure. Immediately visible are the convenience facilities for the animals comprising hay manger 73 which is built into the right hand corner of the angle formed by back panel section 16 and side rail panel 12 forming a right sided triangular shaped vessel with one each of the right sides juxtaposed the back panel section 16 and the side rail panel 12. In the area of the backside, side rail panels 11 and 12 are covered with plywood or other similar siding, more clearly shown as number 48 in FIG. 1.

Proceeding from left to right across back panel section 16, adjacent hay manger 73 is a smaller dish-type water trough 75 for holding water for the penned animals. Dish shaped trough 75 is similarly attached to back panel section 16. To the far right along back panel section 16 is feed trough 74 which also is a right sided triangular shaped vessel having sides adjacent the right angles formed by the back panel section 16 and side rail panel 11. Water trough 75 is supplied with water by means of water tank 76 (shown in dotted form) which is mounted upon back panel section 16 on the side opposite the side presently being viewed which supplies water to the water trough 75 by means of water line 78 (shown in dotted form), also located in part on the opposite side of back panel section 16. Water level is maintained in water trough 75 by means of conventional float valve means 79 (shown in dotted form) interior to water trough 75. The float valve units may be purchased at any hardware store and the one utilized in the preferred embodiment was Bowman Plastic Co., Model Fill-Fast.

Also shown in FIG. 2 is the opening which is covered by panel or cover 50 which may be let down in order that the operator of the subject invention may steer the device when it is moving under its own power. The panel 50, shown in its closed position, attached to the back panel side 16 by means of hinges 51 and latch 53.

The subject invention rides upon back wheel assemblies 62 and 64 shown in FIG. 2 which are connected to the drive means (not shown).

Additionally shown in FIG. 2 are the upright spar support means 82 to which the upper portion of back panel section 16 is attached. Additionally shown in FIG. 2 are the roof 40 rib supports 84 which hold the roof 40 panels against the spar supports 82 through the pressure applied by cable or rope means 86 which lap over the rib supports 84 and are held taunt through the means of turnbuckles (not shown) located upon the opposite side of back panel section 16. The cable or rope means ends are connected at the forward most end of the roof and the other end to the turnbuckle mentioned above.

As can be seen, there have not been a necessity to use bolts, and consequently holes, through the roof and upper portion of the back panel section structure, and by such means the subject invention is so sonstructed to provide flexibility so that the structure may bend as necessary in the presence of high winds without concern that the metal or fiberglass paneling will be torn or wrinkled. Additionally, as will be indicated hereafter, the whole overall structure may be disassembled in a very short order by means of construction such as detailed above.

The spar supports 82 which run along the inside portion of back panel section 16 from a level of the height of the side rail panels to the end of the roof are shaped like an L with the junction of the two sides of the L smoothed into a quarter round having a radius of about 8 inches. The upper portion of the back side of back panel section 16 panels are bent to conform to the spar support shape.

Right angle strip 88 is attached to the outside edge of back panel section 16 and serves to hold the panels and roof 40 to the frame formed by end spar members 83. Angle pieces 88 also tend to limit the sideways travel of back panel section 16 panels and roof 40 panels, it being realized that the upper portion of back panel section 16 and roof 40 are composed, in the preferred embodiment, of overlapping sections of corregated sheet metal or fiberglass. The rib supports 84 are fashioned so that they have alternating troughs and crests in order that they nest in the corregation of the panels which make up the roof 40.

Figure 3:
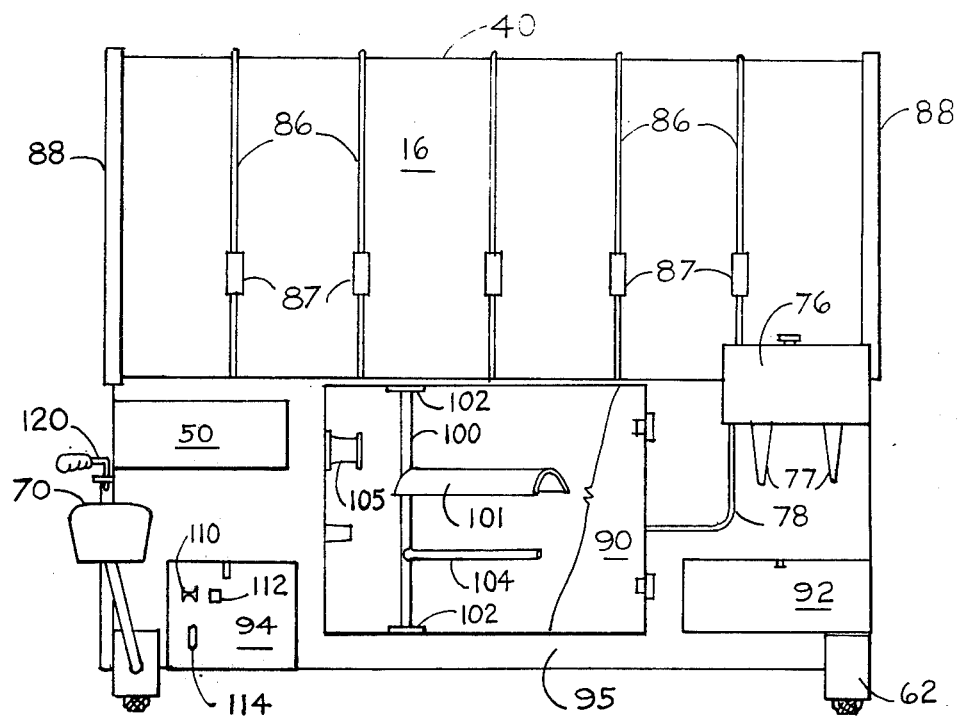
FIG. 3 is a rear view of the exterior rear side.

Reference now to FIG. 3, shows a rear view of back panel section 16 wherein are situated storage facilities for tack 90, water 76, feed 92, together with housing 94 for the prime mover means comprising the motor, clutch, transmission, and differential which drives the unit.

The tack storage box 90 is shown with the door partly cut away to reveal its interior having facilities to receive a saddle, lariat, and other paraphanalia desired. Shaft 100 connects the upper and lower sides of tack storage box 90 and is connected at the top and bottom by swivel means 102 which permit the shaft to rotate in place and thereby permit saddle rack 101 welded thereto to swing out to receive a saddle (not shown) and then be rotated back into the confines of tack storage box 90. Below saddle rack 101 is bar 104 upon which bridles or similar tack may be hung. Bar 104 is also connected to shaft 100. Against the left hand wall is lariat holder 105 about which a coiled lariat may be hung. The door to the tack box 90 is connected to the box by means of hinges and has a latch on the opposite side.

Water storage tank 76 is held in place by means of inverted L-shaped braces 77 attached to the bottom of tank 76. Water line 78 connected to tank 76 feeds water from the bottom of tank 76 across back panel section 16 to water trough 75 (not shown) to connect with float valve assembly 79 (not shown) which regulates the flow of water to maintain a water level.

As previously mentioned in the description of the interior view of back panel section 16, rope or cable means 86 hold down the panels comprising the upper portion of back panel section. Tension in cable means 86 is maintained by means of turnbuckles 87 shown in FIG. 3, the opposite end of the turnbuckles connected to the frame making up the lower portion of back panel section 16.

Feed storage box 92 comprises an elongated top opening wooden box where grain and, if desired, hay may be stored.

Additionally shown in FIG. 3 are the prime mover means housing, engine shroud 94, which has a top mounted lid through which access to the motor, clutch, transmission, and differential may be obtained. Visible and protruding from shroud assembly 94 are the starter pull cord 110, gear shift lever 114, and hand throttle 112.

Also shown in FIG. 3 is steering lever 120 mounted on the side of the rear of back panel section 16. Running across the bottom portion of back panel section 16 is axle shroud 95 which houses the axle connecting the rear wheel assemblies 62 and 64 to the prime mover motor means housed in engine shroud 94.

Figure 4:
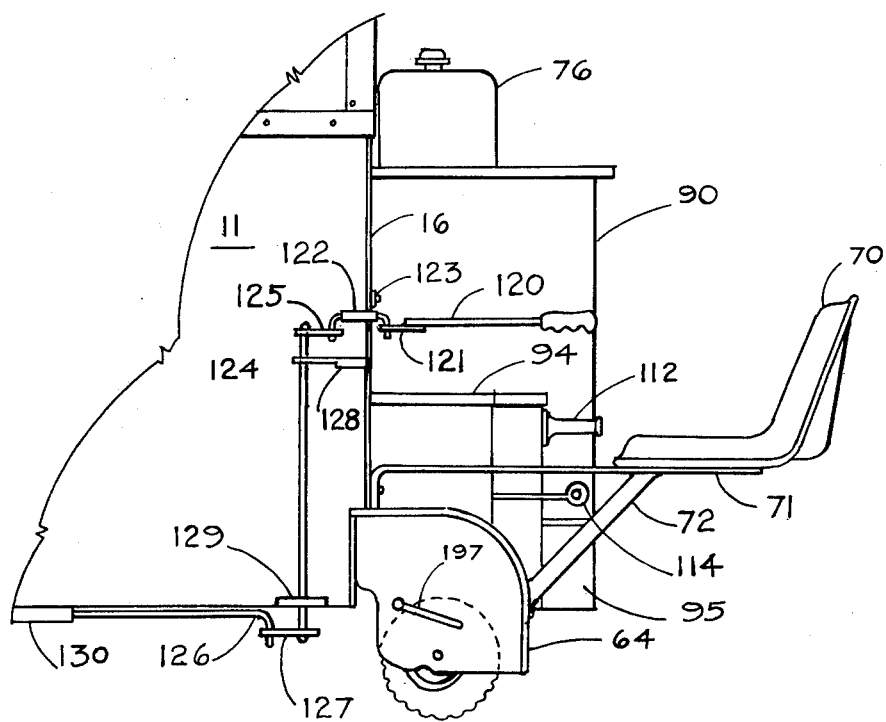
FIG. 4 is a side view of the rear side.

FIG. 4 is a side view of the left hand rear side of the subject invention and shows more of the components which have been alluded to in the above description.

As can be seen in FIG. 4, the left hand rear wheel assembly 64 is fashioned with a brake assembly pedal 120 by which the operator may apply a friction type strap unit (not shown) to the wheel of wheel assembly 64 when it is desired to stop the motion of the subject invention. Also shown in the side view is hand throttle 112 and gear shift lever 114 protruding from engine shroud 94. Additionally, tack box 90 and water tank 76 are shown. Seat 70 is illustrated, being fastened to wheel assembly 64 by means of support 72 and to the frame of the back panel section 16 by support 71. Additionally shown in side view is axle shroud 95.

As can be seen, the steering lever 120 of the steering assembly is shown, the steering assembly comprising in part linkages 122, 124, and 126. Basically, steering lever 120 is permanently attached to plate 121 which pivots about a bolt (not shown) attached to bracket 123 which in turn is affixed to the back panel section 16. Also attached to plate 121 in pivotal fashion is linkage 122 which links plate 125 which is firmly connected to linkage 124. Linkage 124 is permanently connected to plate 127 which in turn has linkage 126 pivotally connected thereto. Obviously then, side to side horizontal movements of steering lever 120 are transmitted by linkage 122 to linkage 124 which rotates about its long axis to provide movement to linkage 126 in the direction of the longitudinal axis of the side rail. Holders 128 and 129 hold linkage 124 and permit its rotation about its longitudinal axis. Linkage 126 continues through the bottom of side rail panels 11 and 10, (FIG. 1) to steering wheel assembly 68 (FIG. 1). Linkage 126 rides interiorly to tubes 130 which provide support for the linkage and protection. The tube 130 extends through the length of side rail panel 11, where linkage 126 exits the tube 130 and then re-enters a similar tube 132 (not shown) attached to the bottom portion of left side rail panel 10 (not shown) to carry linkage 126 until it joins with wheel assembly 68.

In order to provide maximum flexibility of the subject invention, as mentioned earlier, the mobile corral may be shortened or lengthened in its longest direction by means of removal or addition of additional side rail panels and in order to facilitate this convenience, linkage 126 is broken at the end of the first side rail panel 11 where it is connected to, in the embodiment of the invention shown in FIG. 1 the remaining portion of linkage 126 which runs the length of side rail panel 10. This connection between the two portions comprising linkage 126 is made simply by means of threading the ends of the linkage and then having a common threaded coupler screwed on each linkage. Obviously, there are any number of ways to connect the linkages as all that is required is that longitudinal movement be transmitted from one portion of the linkage to the other and to the front wheel assembly 68.

Figure 6A:
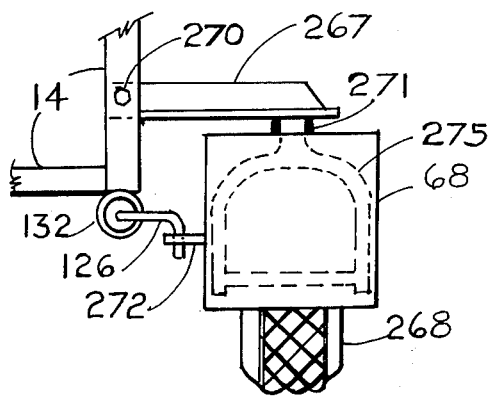
FIGS. 6a and 6b show a front view of the two front wheel assemblies.

Shown in FIG. 6A is front wheel assembly 68 which provides the steering for the invention. Shown is the front rail panel 14 to which attached by bolt means 270 is brace 267. Pivotally connected to brace 267 by swivel means 271 is fork 275 which is fixedly attached to wheel assembly 68 outside shroud. Tire 268 rides interiorly to wheel assembly 68 and rotates about axle 269 (shown in dotted form) connected to fork 275 ends. Axle 269, through fork 275, is permanently attached to the interior portion of the wheel assembly 68 shroud. Swivel means 271 comprises ball bearings and race resting between brace 267 and wheel assembly 68. Attached to the exterior portion of wheel assembly 68 is plate means 272 which has protruding therethrough in pivotal fashion linkage 126 which was discussed above. Linkage 126 eminates from tube 132 which is attached to the bottom of side rail panel 10 offering a passageway for linkage 126 to ride in. Thus movements of the steering lever 120 (FIG. 3) are transmitted into longitudinal movements of linkage 126, which in turn provide for turning of the wheel assembly 68.

Figure 6B:
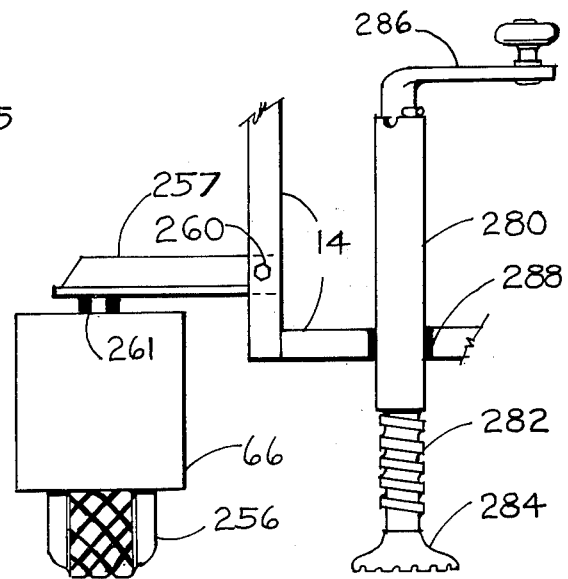

FIG. 6B shows the wheel assembly of the left front wheel on the subject invention. There is shown the front rail section 14 having brace means 257 attached thereto by bolt means 260. Wheel assembly 66, which has wheel 256 mounted interiorly which is permitted to rotate about axle means (not shown). Similarly as with wheel assembly 68, the axle is fixed to an interior fork means (not shown) which in turn attaches to the wheel assembly 66. Wheel assembly 66 is free to rotate about swivel means 261 which, like its counterpart in FIG. 6A (271) may just be a ball bearing and race assembly between brace support 257 and wheel assembly 66.

Figure 5:
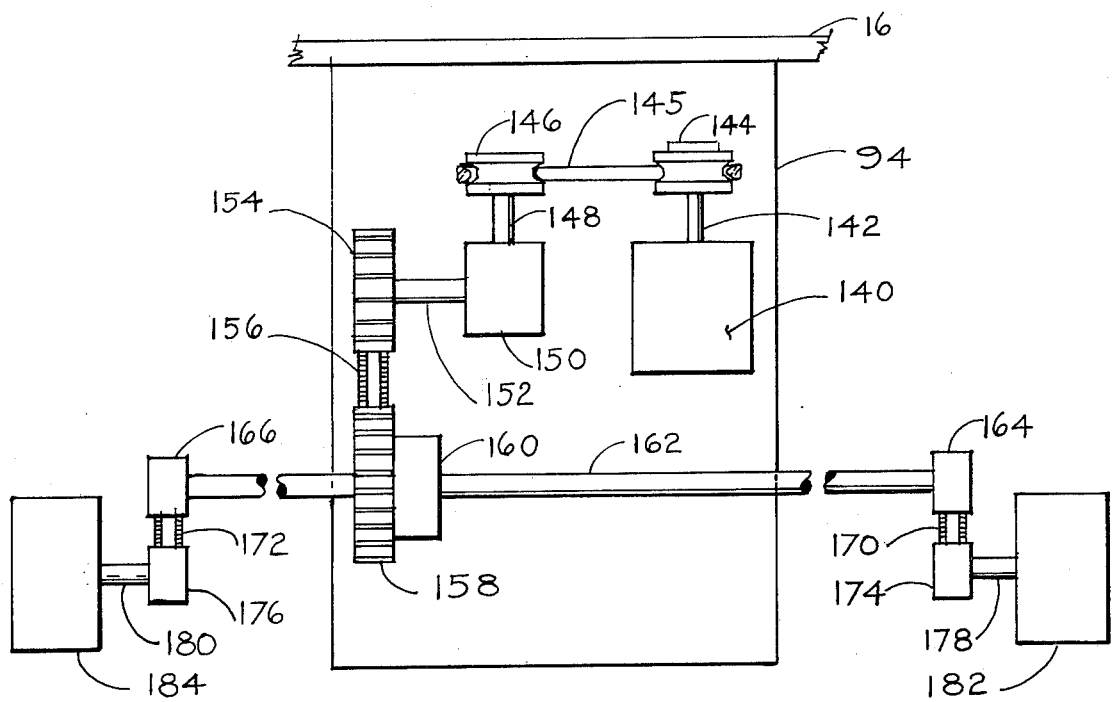
FIG. 5 is a block diagram of the prime mover assembly and drive mechanism.

Reference now is made to FIG. 5 which shows a top view of the components of engine shroud 94, the prime mover means, in block diagram fashion as the motor, clutch, transmission, and differential assembly were, in the preferred embodiment, commerical or manufactured units available to the public.

Referring now to FIG. 5, which covers in addition to the motor transmission unit contained in the engine shroud 94 attached to back panel section 16, the complete drive assembly. The gasoline motor 140, which has a relatively small horsepower rating, nominally 5hp, has attached to its main drive shaft 142 pulley and clutch assembly 144 which connects to pulley assembly 146 by means of flexible V belt 145. Pulley assembly 146, is attached to input shaft 148 of transmission 150. Transmission 150 has upon its output shaft 152 gear sprocket 154. Gear sprocket 154 attaches by means of chain 156 to gear sprocket 158 to which is attached differential assembly 160. Drive shaft 162 eminates from both sides of the gear sprocket 158—differential assembly 160 to gear sprocket 164 and 166 on either ends of drive shaft 162. Thereafter, by means of chains 170 and 172, gears 164 and 166 drive gear sprockets 174 and 176 respectively. Attached by means of shafts 178 and 180 are the left and right rear wheel 184 of wheel assembly 64 and wheel 182 of wheel assembly 62.

Clutch assembly 144 is of the centrifugal friction engaging type which engages only when a certain rotational speed is achieved.

As mentioned earlier, all mechanical components shown in FIG. 5 are readily available commercial units, and those units which were utilized in the preferred embodiments are as follows: gasoline motor: 5hp Briggs & Stratton, Model 130232; transmission: General Leisure, 3 speeds forward, 1 reverse with safety interlock; clutch: North American, 2 inch friction, 2 shoe clutch; differential: Peerless Model D-146 with one inch diameter axle. All pulleys and gear sprockets are of the standard commercially available type and have the following diameter ratios. Pulley 144 is 2 inches in diameter and pulley 146 is 8 inches in diameter. Gear sprocket 154 has 10 teeth and gear sprocket 158 has 54 teeth. Gear sprockets 164 and 166 together with gear sprockets 174 and 176 have all equal numbers of teeth.

Additional features of the subject invention which may be added are jack stands at each of the four corners of the corral in the event that any of the wheels, which in the preferred embodiment are of the pneumatic type, should go flat. These jack stands are of the commercial screw type where a centrally located shaft may be screwed out of the outside casing by an arm and handle means located at the upper portion of the jack. In the preferred embodiment, commercial jacks of the type known as tongue jacks, were a Marvel Industries, 5,000 pound, model Side Winder were utilized. For the sake of illustration, one of the jack stands located at the front left hand corner area is shown in FIG. 6B comprising jack housing 280, central screw shaft 282 with foot 284 and handle 286. Jack housing 280 may be welded or otherwise attached to the front rail panel 14. The embodiment shown in FIG. 6B shows the connection to be welded with weld 288. Similar jack stands are mounted at the other three corners of the subject invention.

Figure 7:
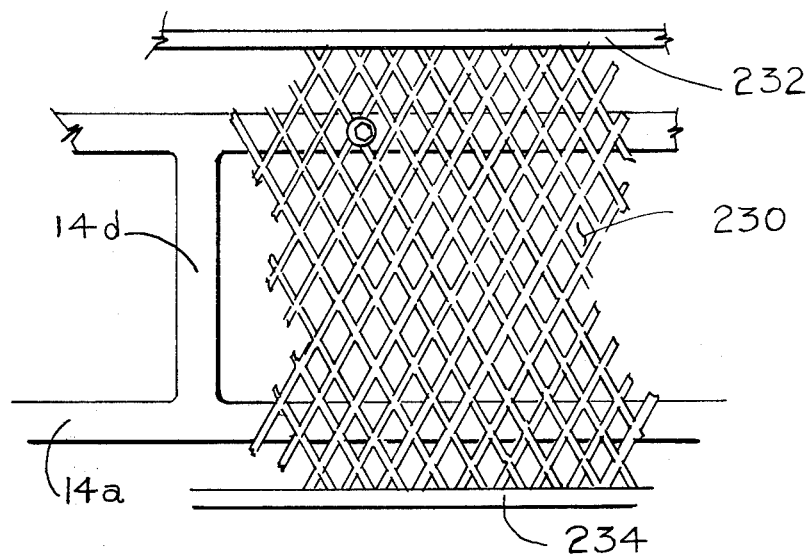
FIG. 7 is an enlarged view of a portion of the fence.

Reference now to FIG. 7 illustrates an additional feature of the subject invention where is illustrated a portion of any of the rail panels which comprise the frame portion of the invention, showing the bottom or lower most square steel tubing, such as, for example, the front rail panel 14a. It must be remembered that as far as the details shown in FIG. 7, any part of the bottom portion of the mobile corral could suffice. Shown in FIG. 7 is heavy metal mesh 230 which, in the preferred embodiment is ¾ inch mesh, 9 gauge steel which is commerically available. Structural support rods 232 and 234 attach at the top and the bottom of metal mesh 230. When it is desired to enclose a small animal which might be able to crawl out beneath the bottom most rail of the fence portion, the metal mesh 230 may be lowered to the ground or to any position above the ground as desired. Bolt means 236, which is connected to the longitudinal rail directly above the bottom most rail protrudes from the metal tubing into one of the openings of metal mesh 230. By lifting metal mesh 230 a slight distance and moving the metal mesh horizontally a slight distance, bolt means 236 may be disengaged from metal mesh 230 and the metal mesh may be moved up or down. The metal mesh runs the total length of the side panel to which it is connected and there may be a plurality of bolt means, if desired, securing that side panel. Normally, the metal mesh slides in U-shaped guides located at both ends of the side rail panel.

When operating and propelling the subject invention, the operator sits on seat 70, starts the gasoline motor 140 by means of the starter pull cord 110 (FIG. 3) and then engages gear shift lever 114. Steering then is accomplished through means of steering lever 120, having remembered that panel 50 should be lowered, so that vision to the right side of subject invention may be had. In the preferred embodiment, the invention has three forward gears and one reverse gear, all being a part of the transmission 150. The speed at which the invention may be driven is controlled by hand throttle 112 and stopping is facilitated by means of brake assembly pedal 197, (FIG. 4) which, as earlier described operates a strap type brake which rubs against the wheel of wheel assembly 64.

As had been mentioned before, the total assembly may be disassembled expeditiously and stored in a relatively small space. All side rail panels are bolted to one another and may be removed and the front rail panel 14 may be attached directly to side rail panels 11 and 12.

When complete disassembly of the system is desired, the system breaks down to the primary side, front, and rear panels. The roof can be removed by loosening the turnbuckles shown in FIG. 3 and removal of the rope or cable means holding the rib supports against the roof corrugated panels.

Side panels 46 and 48, which may be metal, fiberglass, or if desired plywood, may be removed from their positions on the side of the side rail panels and roof structures. Spar supports 82, which attach to the rear panel section 16 may be removed for storage.

As is obvious, the subject invention has many uses, such as pasturing various animals in different places. It may serve as a means of collecting manure in a relatively small space, or quarantining certain animals from the remainder of a herd. All weld fillets in construction of the subject invention are filed smooth for protection of the animals inside and, it should be noted that the triangles formed by supports 26 (FIG. 1) holding up door frame 24 are such that a horse cannot trap his head in the closing angle.

Although the subject invention has utilized the so-called "crazy wheel steering" i.e., steering one wheel of the front two wheel assemblies, it is realized that both front s wheels could be steered with connecting linkages between the wheel assemblies, but, as a matter of convenience and/or ease of construction, only one wheel need be the steering wheel.

While a preferred embodiment has been described, it is intended to cover all modifications and alternate constructions falling within the spirit and the scope of the invention as defined in the appended claims.

I claim:

1. A self-propelled corral enclosure to pen animals comprising a plurality of connected fence sides forming an enclosure, a plurality of wheel means attached to said fence sides, steering means operably connected to at least one of said wheel means, and prime mover means permanently attached to one of said fence sides and made a part thereof, said prime mover means also operably connected to at least one of said wheel means whereby said enclosure may be steered by an operator while propelled by said prime mover means.

2. The enclosure for penning animals as defined in claim 1 wherein said plurality of fence sides defines four sides, one of said sides comprising a rear side having a roof overhanging a portion of said enclosure, and second of said sides comprising a front side having gate means therein, said front side opposite said rear side.

3. The enclosure for penning animals as defined in claim 2 wherein said plurality of wheel means defines two rear drive wheels attached to said rear side and two front wheels attached to said front side.

4. The enclosure for penning animals as defined in claim 3 wherein said steering means comprises steering lever means proximate said rear side and steering linkage means connecting said steering lever means to at least one of said front wheels.

5. The enclosure for penning animals as defined in claim 4 wherein said second of said two front wheels defines a non-directional, non-steerable wheel.

6. The enclosure for penning animals as defined in clam 5 wherein said prime mover means comprises motor means, clutch means connected to said motor means, transmission means connected to said clutch means, and differential means connected to said transmission means and said rear drive wheels.

7. The enclosure for penning animals as defined in claim 6 wherein said rear side additionally comprises animal feeding and watering means, and means for storage of water, feed, saddle, and tack.

8. The enclosure for penning animals as defined in claim 7 wherein said connecting fence sides comprise jack means proximate corners of said enclosure whereby said enclosure and attached wheel means may be lifted off the ground.

9. The enclosure for penning animals as defined in claim 8 wherein said rear side additionally comprises seat means proximate one corner of the connecting fence sides whereby an operator may steer said enclosure from said seat.

* * * * *